United States Patent
Bonazzola

(10) Patent No.: US 10,409,631 B2
(45) Date of Patent: *Sep. 10, 2019

(54) SETUP OF MANAGEMENT SYSTEM IN A VIRTUALIZATION SYSTEM

(71) Applicant: Red Hat, Inc., Raleigh, NC (US)

(72) Inventor: Sandro Bonazzola, Lesmo (IT)

(73) Assignee: Red Hat, Inc., Raleigh, NC (US)

(*) Notice: Subject to any disclaimer, the term of this patent is extended or adjusted under 35 U.S.C. 154(b) by 262 days.

This patent is subject to a terminal disclaimer.

(21) Appl. No.: 15/465,820

(22) Filed: Mar. 22, 2017

(65) Prior Publication Data

US 2017/0192816 A1    Jul. 6, 2017

Related U.S. Application Data

(63) Continuation of application No. 14/295,085, filed on Jun. 3, 2014, now Pat. No. 9,619,218.

(51) Int. Cl.
  *G06F 8/61* (2018.01)
  *G06F 9/445* (2018.01)
  *G06F 9/455* (2018.01)

(52) U.S. Cl.
  CPC ............ *G06F 9/45558* (2013.01); *G06F 8/61* (2013.01); *G06F 9/44505* (2013.01); *G06F 9/45533* (2013.01); *G06F 2009/45562* (2013.01)

(58) Field of Classification Search
  None
  See application file for complete search history.

(56) References Cited

U.S. PATENT DOCUMENTS

2002/0133584 A1    9/2002    Greuel
2012/0117212 A1    5/2012    Fries

OTHER PUBLICATIONS

Natarajan, Ramesh, "VMware ESXi step-by-step Installation Guide with Screenshots", http://www.thegeekstuff.com/2010/06/vmware-esxi-installation-guide/, Jun. 23, 2010, 14 pages.
USPTO, Office Action for U.S. Appl. No. 14/295,085, dated Jul. 25, 2016.
USPTO, Notice of Allowance for U.S. Appl. No. 14/295,085, dated Nov. 30, 2017.

*Primary Examiner* — Qing Yuan Wu
(74) *Attorney, Agent, or Firm* — Lowenstein Sandler LLP

(57) ABSTRACT

Implementations for setup of management system in a virtualization system are disclosed. A method of the disclosure includes verifying, by a setup program executed by a processing device of a host machine, that a management system is installed on a virtual machine (VM) executing on the host machine, wherein the management system installed on the VM is a host controller that manages the VM and manages other VMs of the host machine, confirming that the management system is responsive, and in response to confirming that the management system is responsive, transmitting, by the processing device via the setup program, a command to the management system to add the host machine to a list of host machines associated with the management system.

20 Claims, 4 Drawing Sheets

SETUP OF MANAGEMENT SYSTEM IN A VIRTUALIZATION SYSTEM

PRIORITY CLAIM TO RELATED APPLICATION

This application is a continuation of and claims the benefit under 35 U.S.C. § 120 of U.S. patent application Ser. No. 14/295,085, filed on Jun. 3, 2014, and issued as U.S. Pat. No. 9,619,218 on Apr. 11, 2017, the entirety of which is incorporated herein by reference.

TECHNICAL FIELD

The implementations of the disclosure relate generally to virtualization systems and, more specifically, relate to setup of management system in a virtualization system.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the VM operating system and applications executing on the virtual machine to interact with the virtual processors and virtual devices as though they were actual physical entities.

A management system (e.g., a host controller, manager, or hosted engine) may manage the physical and logical resources associated with a virtualization system including multiple host machines and virtual machines. The management system may be the control center of the virtualization system. An administrator of the virtualization system may define host machines, configure data centers, add storage, define networks, create virtual machines, manage user permission, and use templates from the management system.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for setup of management system in a virtualization system. In one embodiment, the management system is also known as a hosted engine or a host controller of the virtualization system. In one embodiment of the disclosure, the management system is configured to run as a VM of a host machine, where the VMs of the host machine are managed by the management system. A setup component may run on the host machine and can configure the host machine to run a hypervisor and create the VM where the management system is installed afterwards. Then, the VMs of the host machine are managed by the installed management system. The setup program includes logic to verify whether the management system and the virtual machine are active, and enable the management system to add the host machine to a list of host machines running VMs managed by the management system, without user interaction.

Previous implementations of setup of a management system did not provide for a management system running as a VM of a host machine. Typically, the management system was installed on a dedicated machine or on a separate computing device than the host machine with VMs managed by the management system. In addition, the management system was previously installed in the later phases of a setup process, after storage and networking had already been configured. A user would then manually install the management system and configure the settings of the management system.

Embodiments of the disclosure improve virtualization systems by allowing the management system to be deployed using less hardware than previous implementations (as the management system is not utilizing a separate machine to execute). Furthermore, the management system can utilize currently-existing high availability clustering of the virtualization system, instead of using a separate cluster to allow the management system to be highly-available. In addition, by running the management system within a VM, the VM with the management system can be migrated to other hosts in the virtualization system to provide high availability to the management system.

Figure 1:
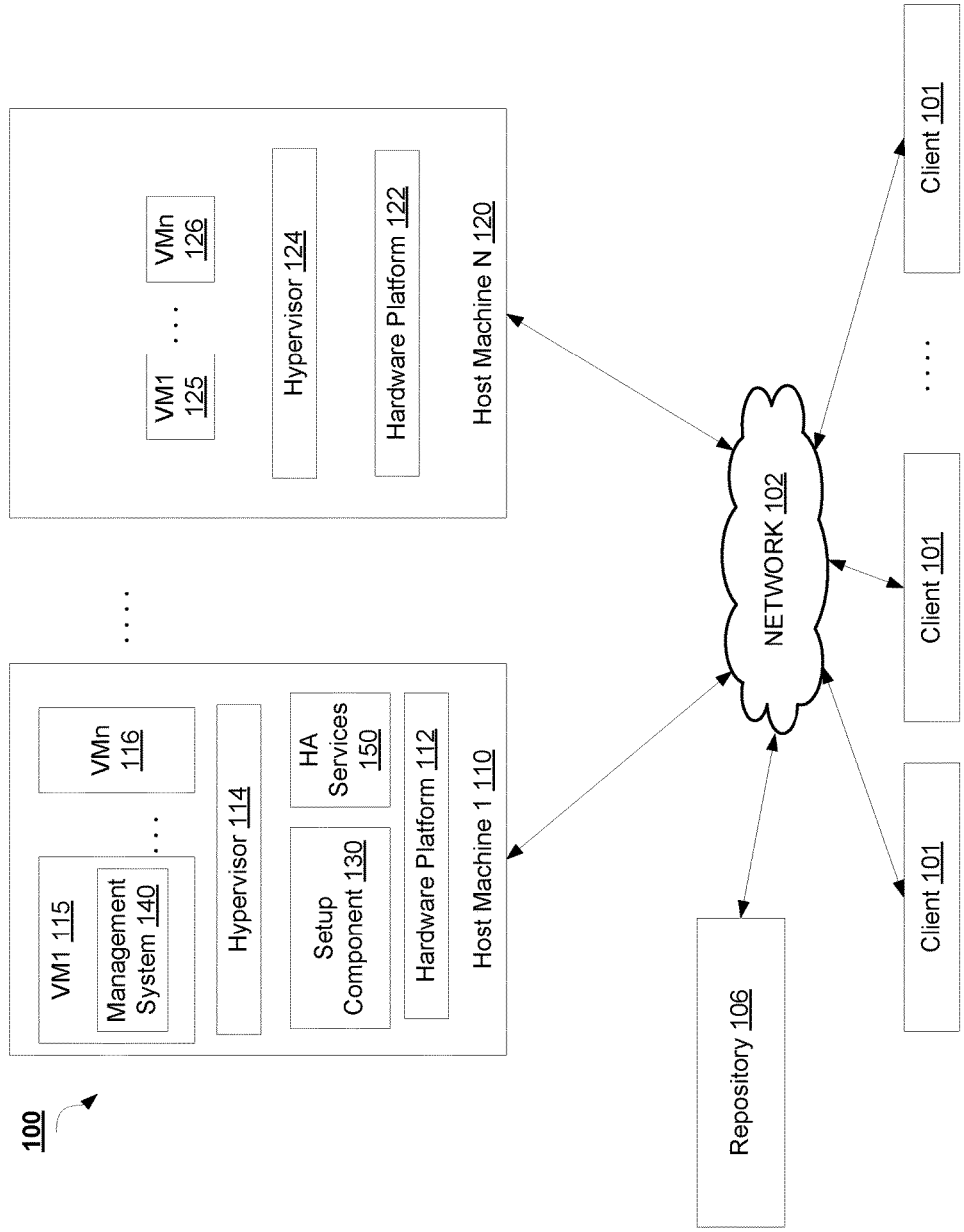
FIG. 1 is a block diagram of a network architecture in which implementations of the disclosure may operate.

FIG. 1 is a block diagram of a network architecture 100 in which implementations of the disclosure may operate. The network architecture 100 includes, but is not limited to, one or more clients 101 communicatively coupled to one or more host machines 110, 120 or a cluster of hosts 110, 120 over a network 102. The clients 101 may include computing devices that have a wide range of processing capabilities. For example, client 101 may be a personal computer (PC), palm-sized computing device, personal digital assistant (PDA), a table computing device, a mobile phone, and so on. Clients 101 may be fat clients (e.g., clients that perform local processing and data storage), thin clients (e.g., clients that perform minimal or no local processing and minimal to no data storage), and/or hybrid clients (e.g., clients that perform local processing but little to no data storage).

The clients 101 may access the host machines 110, 120 over the network 102. The host machines 110, 120 may be physical hosts, virtual hosts, or a combination of physical and virtual hosts. A physical host machine is a hardware computing device enabled to host services, applications, and/or other processes. A virtual host is a virtual machine that runs on top of a hardware computing device, wherein the virtual machine is enabled to host services, applications, and/or other processes. The terms host and host machine are used herein to describe both physical and virtual host machines. Therefore, unless specifically called out as a physical host machine or a virtual host machine, wherever host machines are mentioned it should be understood that these may be virtual or physical host machines. The network 102 may be a private network (e.g., a local area network (LAN), a wide area network (WAN), intranet, etc.) or a public network (e.g., the Internet).

Each host 110, 120 may host one or more virtual machines (VMs) 115, 116, 125, 126, which may run on top of a hypervisor 114, 124. The hypervisor 114, 124 may emulate the underlying hardware platform 112, 122 of the host machine 110, 120 for the VMs 115, 116, 125, 126. The hypervisor 114, 124 may also be known as a virtual machine monitor (VMM) or a kernel-based hypervisor. In some embodiments, the hypervisor 114, 124 is part of an operating system (OS) of the host 110, 120.

VMs 115, 116, 125, 126 can be, for example, hardware emulation, full virtualization, para-virtualization, and operating system-level virtualization VMs. Each VM 115, 116, 125, 126 includes a guest operation system (OS) that may be different from one VM to another VM. The guest OS may include Microsoft Windows™, Linux™, Solaris™, Mac™ OS, and so on. The guest OS may host one or more applications within the VM 115, 116, 125, 126. Moreover, the guest OSes and the host OS may share the same OS type, or the host OS may be a different type of OS than one or more guest OSes.

In one embodiment, each VM 115, 116, 125, 126 hosts or maintains a desktop environment providing virtual desktops for remote clients 101. A virtual desktop is a virtualized desktop computer, and thus includes storage, an OS, applications installed on the OS (e.g., word processing applications, spreadsheet application, web browsing applications, email applications, etc.), and so on. However, rather than these functions being provided and performed at the client 101, they are instead provided and performed by the VM 115, 116, 125, 126. In other embodiments, the VMs 115, 116, 125, 126 are not virtual desktops.

In one embodiment, clients 101 may acts as input/output (I/O) devices, in which a user can view a desktop environment provided by a VM 115, 116, 125, 126 (e.g., a running instances of an OS including storage available to the OS and programs installed and/or running on an OS) on a monitor, and interact with the desktop environment via a keyboard, mouse, microphone, etc. In one embodiment, a majority of the processing is not performed at the client 101, and is instead performed by the VMs 115, 116, 125, 126 hosted by the hosts 110, 120. From the user's point of view, the virtual desktop functions as a physical desktop (e.g., a personal computer) and is indistinguishable from a physical desktop.

The VMs 115, 116, 125, 126, running on the hosts 110, 120 may be managed by a management system 140. The management system 140 may also be known as a host controller or a hosted engine. The management system 140 may monitor and control VMs 115, 116, 125, 126 running on hosts 110, 120. The management system 140 may manage one or more of provisioning new VMs, connection protocols between clients 101 and VMs 115, 116, 125, 126, user sessions (e.g., user authentication and verification, etc.), backup and restore, image management, VM migration, load balancing, network provisioning, storage provisioning. The management system 140 may configure host machines, configure data centers, add a VM, delete a VM, balance load on a cluster of host machines, provide directory service to the VMs, add storage, define networks, create virtual machines, manage user permission, use templates from the management system (e.g., VM templates that are used for creating new VMs with predefined settings and preinstalled disk images), and perform other management functions.

In one embodiment of the disclosure, the management system 140 is configured to run on a VM 115 of a host machine 110, where both of the VM 115 and other VMs 116 are managed by the management system 140. Embodiments of the disclosure provide an ability to run the management system 140 as a VM 115 on a host 110 that have VMs managed by the management system 140. A setup component 130 may run on host machine 110 to configure the host machine 110 to run a hypervisor 114 and create the VM 115 where the management system 140 is installed afterwards. The setup component 130 may include software or firmware obtained from a repository 106 to run on the host machine 110. In one embodiment, the setup component 130 may be obtained as a RPM Package Manager (RPM) package for distribution to the host machine 110. An administrator of the virtualization system may submit a request to install the setup component 130 on host machine 110.

Once the setup component 130 is installed and running on host machine 110, a configuration process is performed by the setup component 130. The configuration process includes, but is not limited to, a storage configuration portion, a network configuration portion, a VM configuration portion, and a management system configuration portion. During each portion of the setup process, a user, such as an administrator of the virtualization system, is prompted for various pieces of information related to configuration of the VM 115 and management system 140 to be installed.

First, during the storage configuration portion of the setup process, the setup component 130 asks for a shared storage connection path and a storage domain and datacenter name. Next, during the network configuration portion of the setup process, the setup component 130 asks for Network Interface Card (NIC) information. The setup component 130 then, during the VM configuration portion of the setup process, asks for memory size, number of virtual CPUs for the VM, and so on. Lastly, during the management system configuration portion of the setup process, the setup component 130 asks for a host name and password. In one embodiment, the host name is the name of the VM 115 and the password is a password for accessing the management system 140. In embodiments of the disclosure, the configuration process may request additional information from the user in addition to the information specified above.

After the configuration process ends, the setup component 130 utilizes the obtained configuration information to perform an install portion of the setup process. The install portions includes, but is not limited to, the setup component 130 starting a controller daemon (such as Virtual Desktop and Server Manager (VDSM)), creating a storage domain and pool, connecting to the storage pool, configuring a network device to create a network bridge interface, creating the VM 115, and starting virtual network controller (VNC). The setup component 130 performs the noted activities automatically and without user involvement. In some embodiments, the setup component 130 may perform other activities in addition to the specified activities above as part of the install portion of the setup process.

The setup component 130 may then provide the user a temporary password to connect to the VM 115. In one embodiment, the setup component 130 further prompts the user to install the OS inside the VM 115 and verifies that the OS installation completed successfully. In one embodiment, the setup component 130 determines whether the OS is successfully installed within the VM 115. Once a successful OS install is verified by the setup component 130, the setup component 130 restarts the VM and initiates (e.g., upon a prompting the user) the process of connecting to the VM and installing the management system 140 inside the VM 115. The setup component 130 also verifies that the management system 140 installation is completed successfully. In one embodiment, the setup component 130 queries the user to confirm whether the management system 140 is successfully installed within the VM 115.

The setup component 130 may independently verify that the management system 140 in the VM 115 is responding. In one embodiment, the setup component 130 may access a "health page" associated with the management system 140 that details status of the management system 140 and can be used to verify that the management system 140 is running correctly. When the setup component 140 verifies that the management system 140 is responding, the setup component 140 then sends a command, such as a network call, to the management system 140 to add the host machine 110 to a list of hosts associated with the management system 140. The setup component 130 waits for confirmation from the management system 140 that the host machine 110 has been added to the management system 140, and once received, prompts the user to restart the VM 115 in order to hand over management control of the VM 115 to high availability services 150 running on the physical host. The high availability services 150 may include logic to restart or migrate the VM 115 with the management system 140 in the event of host or VM failure. Once the VM 115 restarts, the management system 140 provides management functions and services for the host machine 110 and the VM 115.

Figure 2:
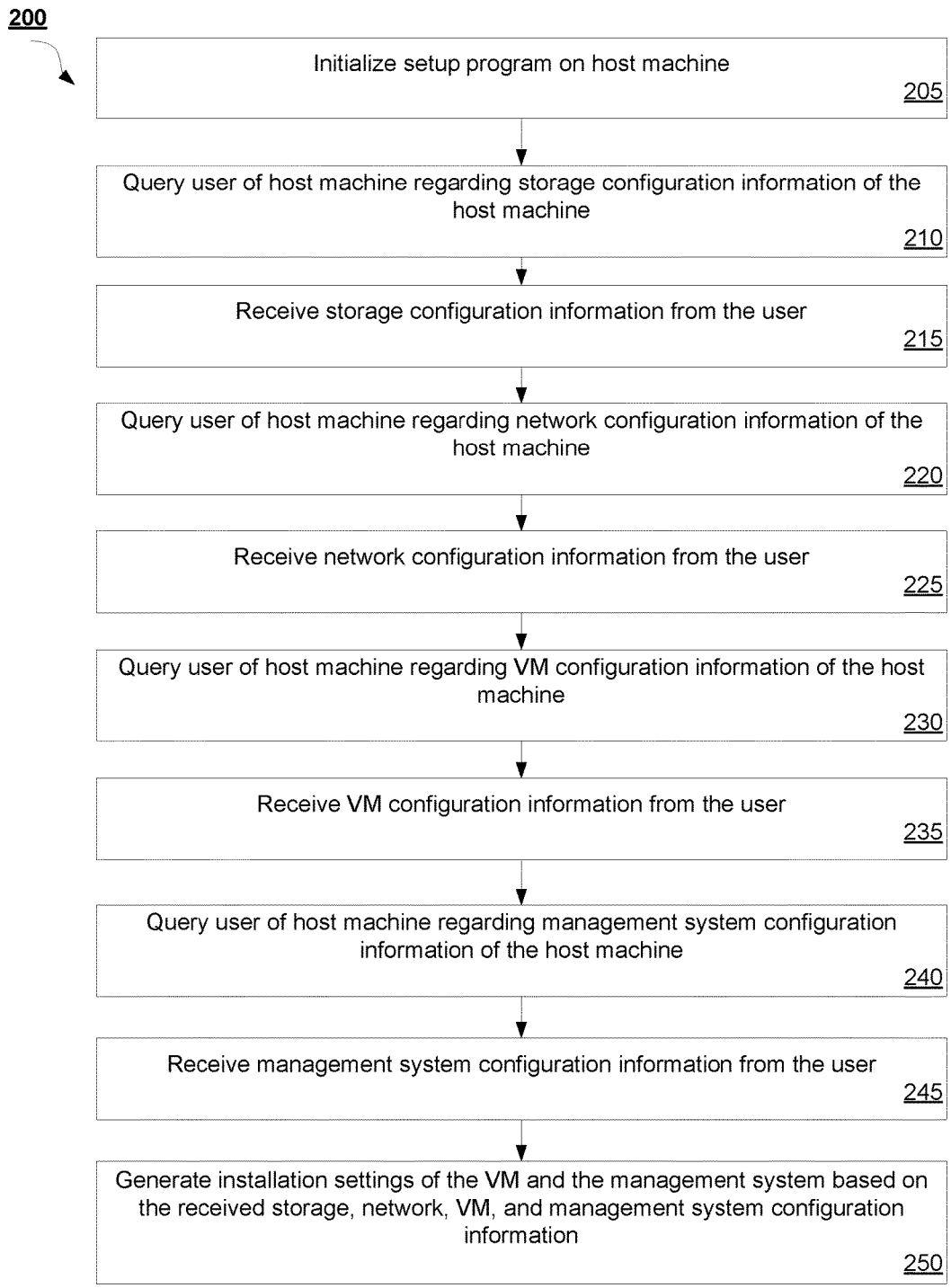
FIG. 2 is a flow diagram illustrating a method for a configuration portion of a setup of a management system on a virtualization system according to an implementation of the disclosure.

FIG. 2 is a flow diagram illustrating a method 200 for a configuration portion of a setup of a management system on a virtualization system according to an implementation of the disclosure. Method 200 may be performed by processing logic that may comprise hardware (e.g., circuitry, dedicated logic, programmable logic, microcode, etc.), software (such as instructions run on a processing device), firmware, or a combination thereof. In one implementation, method 200 is performed by setup component 130 described with respect to FIG. 1.

Method 200 begins at block 205, where a setup program is initialized on a host machine. In one implementation, the setup program may be obtained as an RPM package from a remote repository. At block 210, a user, such as an administrator, of the host machine is queried by the setup program regarding storage configuration information of the host machine. At block 215, the storage configuration information is received from the user. Then, at block 220, the user is queried by the setup program regarding network configuration information of the host machine. At block 225, the network configuration information is received from the user.

Subsequently, at block 230, the user is queried by the setup program regarding VM configuration information of the host machine. At block 235, the VM configuration information is received from the user. At block 240, the user is queried by the setup program regarding management system configuration information of the host machine. The management system may also be referred to as a hosted engine, host controller, or a manager. The management system may monitor and control VMs running on hosts. The management system may manage one or more of provisioning new VMs, connection protocols between clients and VMs, user sessions (e.g., user authentication and verification, etc.), backup and restore, image management, VM migration, load balancing, network provisioning, storage provisioning. The management system may configure host machines, configure data centers, add a VM, delete a VM, balance load on a cluster of host machines, provide directory service to the VMs, add storage, define networks, create virtual machines, manager user permission, use templates (e.g., VM templates) from the management system, and perform other management functions.

At block 245, the management system configuration information is received from the user. Lastly, at block 250, installation settings of the VM and the management system are generated based on the received storage, network, VM, and management system configuration information.

Figure 3:
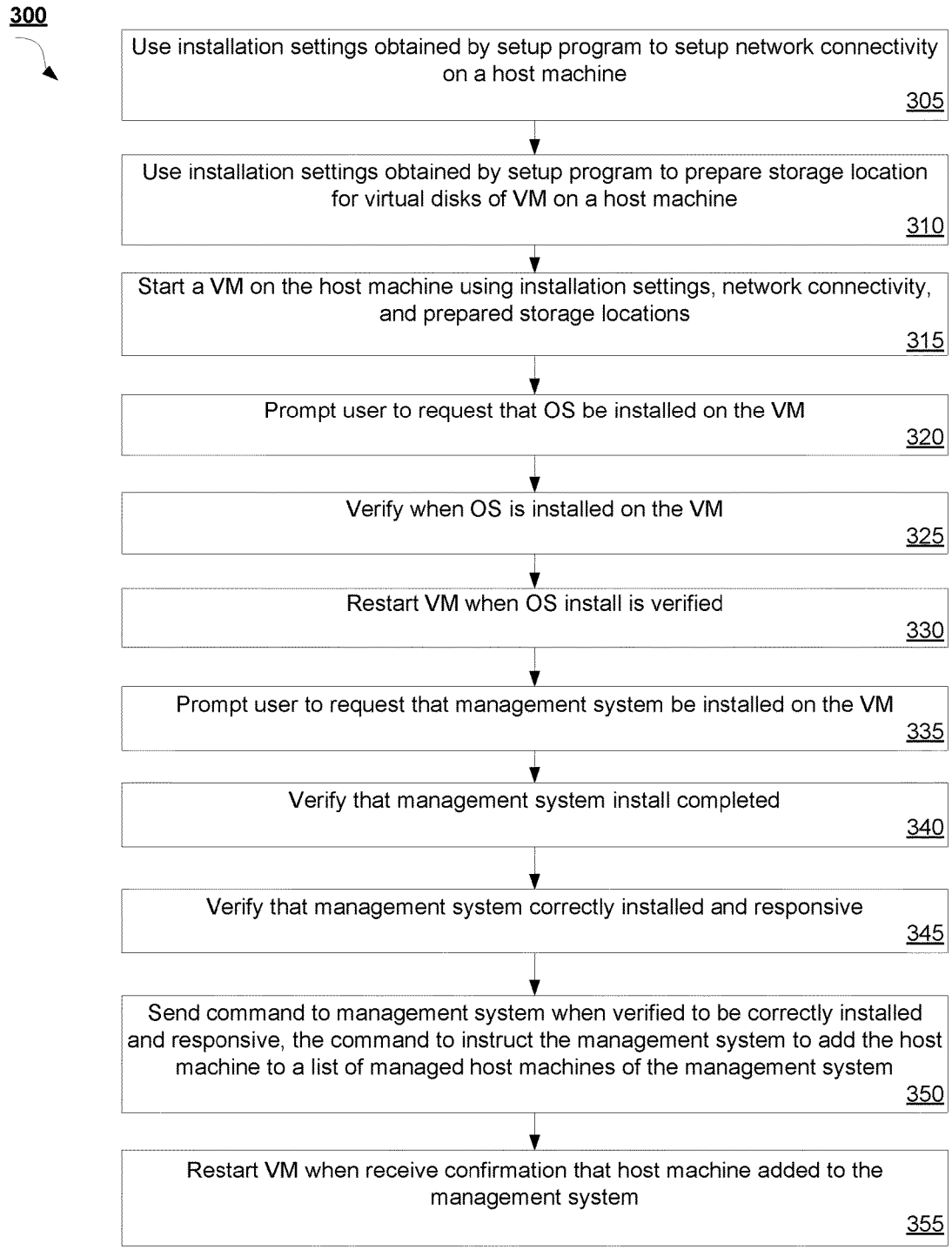
FIG. 3 is a flow diagram illustrating a method for an install portion of a setup of a management system in a virtualization system according to an implementation of the disclosure.

FIG. 3 is a flow diagram illustrating a method 300 for an install portion of a setup of a management system in a virtualization system according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by setup component 130 described with respect to FIG. 1.

Method 300 begins at block 305, where installation settings obtained by a setup program are used to setup network connectivity on a host machine running the setup program. In one embodiment, the installation settings may be the same as the installation settings generated at block 250 of FIG. 2. Then, at block 310, the installation settings are used by the setup program to prepare a storage location for virtual disks of a VM on the host machine. At block 315, a VM on the host machine is started using the installation settings, the established network connectivity, and the prepared storage location for the virtual disks of the VM.

Subsequently, at block 320, the user is prompted to request that OS be installed on the VM. Then, at block 325, the setup program verifies when the OS has been installed on the VM. In one embodiment, the setup program queries the user to confirm that the OS has been successfully installed. At block 330, the VM is restarted once the OS install is verified. Then, at block 335, the user is prompted to request that a management system be installed on the VM. At block 340, the setup program verifies that the install of the management system has completed. In one embodiment, the setup program queries the user to confirm that the management system has completed installing.

Subsequently, at block 345, the setup program verifies that the management system was correctly installed and is responsive. In one embodiment, the setup program references a health page of the management system to determine whether the management system installed correctly and is responsive. At block 350, when the management system is verified to have been installed correctly and is responsive, the setup program sends a command to the management system to instruct the management system to add the host machine to a list of host machines associated with the management system. Lastly, at block 355, the VM is restarted by the setup program when confirmation that the host machine is added to the management system is received. Once the VM restarts, the management system performs its management functionality. Subsequently, if the VM goes down, the high availability service is responsible for bringing the VM (and, as such, the management system) back up.

Figure 4:
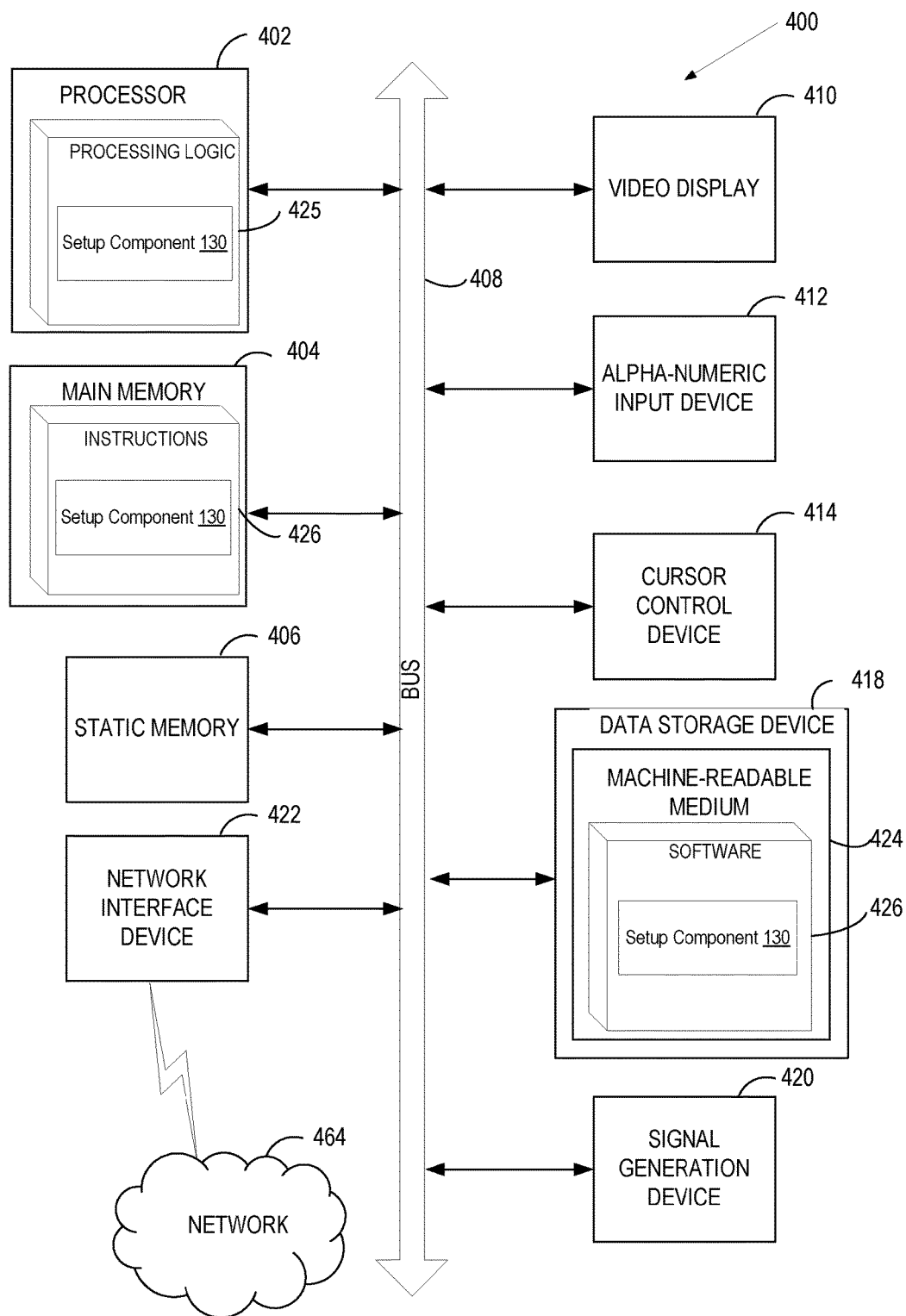
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to implement a setup component 130 to implement setup of a hosted engine in a virtualization system, such as the setup component 130 described with respect to FIG. 1, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", "translating", "causing", "installing", "verifying", "confirming", "restarting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    verifying, by a processing device of a host machine executing a setup program, that a management system is installed on a virtual machine (VM) executing on the host machine, wherein the management system installed on the VM is a host controller that manages the VM and manages other VMs of the host machine;
    confirming, by the processing device executing the setup program, that the management system is responsive; and
    in response to confirming that the management system is responsive, transmitting a command to the management system to add the host machine to a list of host machines associated with the management system.

2. The method of claim 1, further comprising querying a user of the host machine for configuration information used to install the VM on the host machine, wherein the configuration information comprises network configuration information of the host machine and the VM, storage configuration information of the host machine and the VM, VM configuration information, and management system configuration information.

3. The method of claim 1, wherein confirming that the management system is responsive further comprises querying a user of the host machine to confirm that the management system is successfully installed.

4. The method of claim 1, further comprising:
    prompting a user to request that an operating system (OS) be installed on the VM; and
    prompting a user to request that the management system be installed on the VM.

5. The method of claim 1, further comprising:
    verifying that an operating system (OS) is installed on the VM; and
    restarting the VM upon verifying the OS is installed and prior to the verifying that the management system is installed.

6. The method of claim 1, wherein confirming that the management system is responsive further comprises referencing a health page of the management system to determine whether the management system was installed correctly and can communicate.

7. The method of claim 5, wherein high availability services executing on the host machine control a placement and a startup of the VM on the host machine subsequent to the restarting, wherein the high availability services comprise logic to at least one of migrate or restart the VM in response to failure of at least one of the host machine or the VM.

8. The method of claim 7, further comprising restarting the VM in response to receiving, from the management system at the VM, a confirmation that the host machine is added to the list of the management system.

9. The method of claim 1, further comprising providing a temporary password to a user, the temporary password to allow the user to connect to the VM.

10. A host machine, comprising:
    a memory; and
    a processing device communicably coupled to the memory, the processing device to:
        verify, via a setup program executable from the memory by the processing device, that a management system is installed on a virtual machine (VM) executing on the host machine, wherein the management system installed on the VM is a host controller that manages the VM and manages other VMs of the host machine;
        confirm that the management system is responsive; and
        in response to confirming that the management system is responsive, transmit a command to the management system to add the host machine to a list of host machines associated with the management system.

11. The host machine of claim 10, wherein the processing device is further to query a user of the host machine for configuration information, wherein the configuration information comprises network configuration information of the host machine and the VM, storage configuration information of the host machine and the VM, VM configuration information, and management system configuration information.

12. The host machine of claim 10, wherein the processing device to confirm that the management system is responsive further comprises the processing device to query a user of the host machine to confirm that the management system is successfully installed.

13. The host machine of claim 10, wherein the processing device is further to:
    prompt a user to request that an operating system (OS) be installed on the VM; and
    prompt a user to request that the management system be installed on the VM.

14. The host machine of claim 10, wherein the processing device is further to:
verify that an operating system (OS) is installed on the VM; and
restart the VM upon verifying the OS is installed and prior to the verifying that the management system is installed.

15. The host machine of claim 10, wherein the processing device is further to further provide a temporary password to a user, the temporary password to allow the user to connect to the VM.

16. The host machine of claim 14, wherein high availability services executing on the host machine control a placement and a startup of the VM on the host machine subsequent to the restarting, wherein the high availability services comprise logic to at least one of migrate or restart the VM in response to failure of at least one of the host machine or the VM.

17. A non-transitory machine-readable storage medium including instructions that, when accessed by a processing device, cause the processing device to:
verify, by the processing device of a host machine executing a setup program, that a management system is installed on a virtual machine (VM) executing on the host machine, wherein the management system installed on the VM is a host controller that manages the VM and manages other VMs of the host machine;
confirm, by the processing device executing the setup program, that the management system is responsive; and
in response to confirming that the management system is responsive, transmit a command to the management system to add the host machine to a list of host machines associated with the management system.

18. The non-transitory machine-readable storage medium of claim 17, wherein the processing device to confirm that the management system is responsive further comprises the processing device to query a user of the host machine to confirm that the management system is successfully installed.

19. The non-transitory machine-readable storage medium of claim 17, wherein the processing device is further to further provide a temporary password to a user, the temporary password to allow the user to connect to the VM.

20. The non-transitory machine-readable storage medium of claim 17, wherein high availability services executing on the host machine control a placement and a startup of the VM on the host machine subsequent to restarting the VM, wherein the high availability services comprise logic to at least one of migrate or restart the VM in response to failure of at least one of the host machine or the VM.

* * * * *